US005743294A

United States Patent [19]

Donzella

[11] Patent Number: 5,743,294

[45] Date of Patent: Apr. 28, 1998

[54] LIQUID FLOW CONTROL VALVE AND BOTTLE ADAPTER

[76] Inventor: John G. Donzella, 8021 Bergenline Ave., North Bergen, N.J. 07047

[21] Appl. No.: 759,522

[22] Filed: Dec. 4, 1996

[51] Int. Cl.[6] .................................................. F16K 24/00

[52] U.S. Cl. ................ 137/588; 137/625.19; 222/481.5; 222/482

[58] Field of Search .............................. 137/588, 625.19, 137/595, 625.18; 222/482, 483, 484, 481.5

[56] References Cited

U.S. PATENT DOCUMENTS

| | | | |
|---|---|---|---|
| 608,480 | 8/1898 | Ritter | 137/625.19 |
| 612,211 | 10/1898 | McCallum | 137/625.19 |
| 659,977 | 10/1900 | Kitterman | 137/625.19 |
| 1,829,277 | 10/1931 | Haase et al. | 137/625.19 |
| 2,239,275 | 4/1941 | Schwab | 137/588 |
| 2,597,593 | 5/1952 | Neuner | 222/482 |
| 2,986,310 | 3/1959 | Spaulding | 222/481.5 |
| 4,386,718 | 6/1983 | Steart et al. | 222/482 |
| 4,715,516 | 12/1987 | Salvail | 222/481.5 |
| 4,722,463 | 2/1988 | Anderson | 222/481.5 |
| 4,930,666 | 6/1990 | Rudick | 222/482 |

FOREIGN PATENT DOCUMENTS

| | | | |
|---|---|---|---|
| 246452 | 9/1947 | Sweden | 222/481.5 |
| 2063219 | 6/1981 | United Kingdom | 222/481.5 |
| 2220408 | 1/1990 | United Kingdom | 222/481.5 |

*Primary Examiner*—Denise L. Ferensic
*Assistant Examiner*—Joanne Y. Kim
*Attorney, Agent, or Firm*—Donald R. Heiner, Esq.

[57] ABSTRACT

The invention relates to a combination fluid flow, open - closed valve, adapted to be fitted to a container holding a liquid, whereby a desired quantity of the liquid can be dispensed from the container into a second, smaller container. The first container is inverted and held in place by any suitable support such as a mounting bracket and an air supply is provided to the top of the liquid level so that the liquid will flow from the larger to the smaller container when the fluid flow valve is opened. A suitable adapter is provided for receiving and holding the valve wherein the adapter has internal threads for attachment to the container dispensing the liquid and an "O" ring for sealing the liquid from the adapter.

7 Claims, 4 Drawing Sheets

LIQUID FLOW CONTROL VALVE AND BOTTLE ADAPTER

BACKGROUND OF INVENTION

1. Field of the Invention

The present invention relates to an open-closed liquid flow control valve and adapter to be fitted to a liquid container of the type having a cap threadably engaging external or male threads wherein the adapter has internal or female threads such that the combination liquid flow control valve and adapter can be threadably connected to the liquid container such as a one-gallon bottle. The container is then inverted and held in place by any well known device such as a wall rack. Air pressure is supplied to the top of the liquid level by any one of several known means including, but not necessarily limited to, a pinhole through the bottom of the container or a tube extending from the ambient air up through the valve and adapter and liquid container a distance above the liquid level. The valve is then rotated by hand, within the adapter, to the open position and the liquid flows easily, and in a controlled fashion, into a second and usually smaller container until an operator turns the valve to the off position thereby stopping the liquid flow.

As an alternative to an adapter the valve can be attached to a bottle cap which can then be screwed onto the container or bottle. In this embodiment a pinhole is made through the container bottom for equalizing the air pressure on the top of the liquid surface with the ambient air.

2. Description of the Prior Art

A search of the prior art has uncovered patents to L. Koukal, U.S. Pat. No. 2,141,870; L. Koukal, U.S. Pat. No. 2,141,871; W. Greening, U.S. Pat. No. 2,333,310; E. Schwarzkopf, U.S. Pat. No. 2,283,652; O. S. Reid, U.S. Pat. No. 2,708,056; and, J. H. Smith, U.S. Pat. No. 2,734,659.

The patent to Koukal, U.S. Pat. No. 2,141,870 relates to a combined bottle stopper and liquid measuring device. This device is a bottle stopper rather than an adapter which fits over the outside of a bottle. Further, the bottle in this patent would not be inverted 180°. Still further, it dispenses a "predetermined quantity of liquid".

The patent to Koukal, U.S. Pat. No. 2,141,871 also is a combined bottle stopper and measuring device. Again, it is noted that this is a stopper and not an adapter which fits over a bottle. Extending through the body and fixedly secured thereto is an air vent tube which admits air into a bottle during the pouring of liquid contents therefrom.

The Greening U.S. Pat. No. 2,333,310 relates to a fluid flow control valve wherein it is an object to provide a constant flow regulating valve that may be conveniently connected to the necks and mouths of the conventional containers utilized by manufacturers and producers of liquid fertilizers. Clearly, the valve of the instant invention is different from the valve in Greening.

The patent to Schwarzkopf, U.S. Pat. No. 2,283,652 is a liquid dispensing apparatus wherein number 1 represents a cap adapter to be screwed upon or otherwise fastened to the neck of a bottle and wherein the wall of the cap at the inner end of the sleeve 2 is provided with a series of holes or passages through which liquid may flow from the bottle when the latter is inverted. Again, the actual valve of the instant invention which is integrally formed with the adapter is different from the valve disclosed in the Schwarzkopf patent.

The patent to Reid, U.S. Pat. No. 2,708,056 is a valve with vent. In addition to serving as a dispensing means, the arrangement 10 serves also as a closure member when the bottle is in its upside-down position and also when the bottle is placed in an upright position. This patent recognizes that the valve, which "per se" forms no part of the invention and that the valve may be of different constructions. In the instant case it is the combination of the adapter and the valve which is novel.

The patent to Smith, U.S. Pat. No. 2,734,659 is for a mechanical automatic liquid dispenser which is in a much more sophisticated environment then shown in the instant application and, therefore, is not believed relevant.

SUMMARY OF THE INVENTION

According to the present invention there is provided a fluid flow control valve and adapter of unique design to be used in conjunction with a bottle of liquid having external threads whereby the adapter can be secured to the bottle by means of mating internal threads. The valve and adapter, in a preferred embodiment of the invention, is of unitary construction wherein the valve extends perpendicular to the longitudal axis of the adapter and through the adapter. The valve is a rod which is rotatable in the adapter and has a handle attached at one end, externally of the adapter, for opening and closing the valve by rotating the handle 90°. Two apertures extend through the valve; one in fluid flow communication with the liquid in the bottle and the other of which communicates with ambient air.

Two longitudinal openings, essentially parallel to each other, extend vertically from the top to the bottom of the adapter in fluid flow communication with the ambient air and the liquid in the bottle.

When the valve is closed there is no fluid flow and when the valve handle is rotated 90° the liquid in the bottle flows through the valve and one of the longitudinal openings and air flows through the other longitudinal opening and valve and through a tube which extends from the opening upward to the top of the liquid surface to equalize the pressure on top of the liquid with the ambient air thereby allowing the liquid to flow.

It is therefore an object of the present invention to provide a fluid control valve and adapter of unique design.

It is another object of the invention to provide an adapter attachable to a liquid container, such as a bottle, wherein the adapter has internal threads for threadably engaging external threads on the bottle.

It is a further object of the invention to provide such an adapter having a valve extending therethrough and having a valve handle attached at one end thereof for opening and closing the valve.

It is still a further object of the invention to provide such an adapter having a means to communicate ambient air pressure to the liquid level surface in the liquid container when the control valve is in the open position.

It is still a further object of the invention to provide such an adapter - valve assembly having a tube extending from the upper liquid surface in the container downward through the container and into one of the longitudinally extending apertures in the adapter which in turn communicates with the ambient air.

In a second embodiment of the invention, the valve is not disposed through the adapter but rather is fitted to a separate vertically extending section which in turn cooperates with the adapter. In this embodiment, the aperture which extends through the adapter and communicates with the ambient air would have a sealing means which can be opened or closed alternately to allow the ambient air to communicate with or be shut off from the tube communicating with the upper surface of the liquid.

In a second alternative embodiment a bottle cap is fitted with a vertically extending tube which extends through the cap and communicates with the liquid in the bottle. A valve is operatively associated with the tube which can be alternately opened or closed to allow the liquid to flow from the container into a smaller container to be collected by the operator. In this embodiment a pinhole is inserted through the bottom of the bottle such that the ambient air can communicate with the upper surface of the liquid therefor allowing the liquid to flow.

These and other objects, features, and advantages of the invention shall become apparent from the following detailed description of a preferred embodiment thereof when taken in conjunction with the drawings wherein like reference characters refer to corresponding parts in the several views.

DETAILED DESCRIPTION OF THE PREFERRED EMBODIMENT

An adapter comprising a length of PVC, poly vinyl chloride rod or other suitable material and which is tapered at one end and which has internal or female threads for engaging the neck of a bottle and wherein such adapter is fitted with a simple open-closed valve will now be described with reference to FIGS. 1, 2*a*, 2*b*, and 3 of the drawings and alternate embodiments will be described with reference to the foregoing and additional FIGS. 4 and 5.

The basic adapter is shown in the several views at 10 and is preferably formed from a piece of solid PVC rod cut to a particular length although it should be understood that the adapter can be formed or made from any suitable material usually depending upon the liquid to be handled.

Adapter 10 has a tapered portion 11 formed integrally therewith and a discharge nozzle or spout 12 extending downwardly therefrom which can be a separate piece or can also be formed integrally with the adapter. The discharge nozzle aids in directing the flow of liquid from the adapter-valve assembly into a receiving container as clearly shown in FIG. 1.

Figure 1:
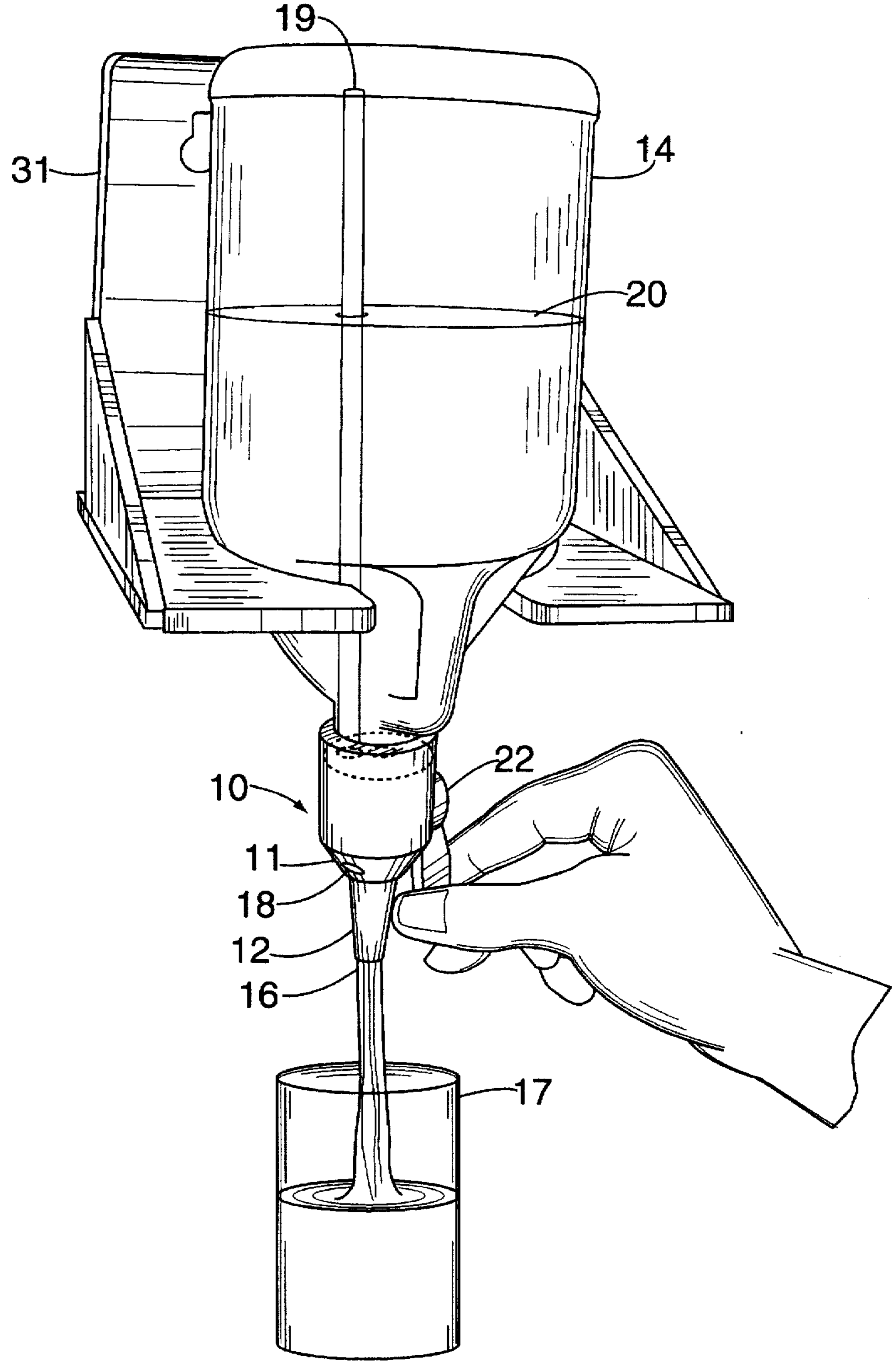
FIG. 1 is a perspective view of a preferred embodiment of the combination valve and adapter shown mounted on an inverted bottle or jug which in turn is mounted on a wall rack. Also shown is a second container for receiving the liquid to be dispensed.

Adapter 10 further has internally or female threads 13 formed internally therewith at the upper end thereof for threadably connecting the adapter to a large liquid container shown at 14 in FIG. 1.

An "O" ring 15 of any suitable material for cooperating with the specific liquid in container 14 is disposed in the upper end of adapter 10, below threads 13, for sealing the liquid flow from the threads 13 when the adapter is secured to container 14.

An axially extending opening 16 is formed through the entire length of adapter 10 from the bottom of the discharge nozzle 12 up through tapered portion 11 and terminates at the upper end of the adapter 10 at the level of "O" ring 15 where it is in communication with the liquid in container 14. As will be more fully described below the liquid in the container can flow downwardly through opening 16 and into a liquid receiving means such as illustratively shown at 17 in FIG. 1 when a valve, yet to be described, is opened.

A second axially extending opening 18 is formed through a portion of adapter 10 with its lower end terminating in tapered portion 11 and its upper end terminating at the upper end of the adapter 10 at the level of "O" ring 15, or, at the same level as the upper end of axially extending opening 16 previously described. A tube 19 is inserted into the upper end of this second axially extending opening 18 which tube 19 extends upwardly and above liquid level 20 as best seen in FIG. 1. As will be described below, when a valve, yet to be described, is opened ambient air will communicate with the upper liquid level 20 allowing the liquid to flow downwardly from container 14, through axially extending opening 16, through nozzle 12 and into liquid receiving means 17 all as best seen in FIG. 1.

Axially extending openings 16 and 18 are formed in adapter 10, parallel to each other, both terminating at their upper ends at the upper end of adapter 10, and below threads 13 and "O" ring 15. Opening 16 communicates with the liquid in container 14 and opening 18 communicates, through tube 19, with the upper liquid level 20 thereby equalizing the pressure on the liquid level with ambient air pressure thereby allowing the liquid to freely flow.

Figure 2A:
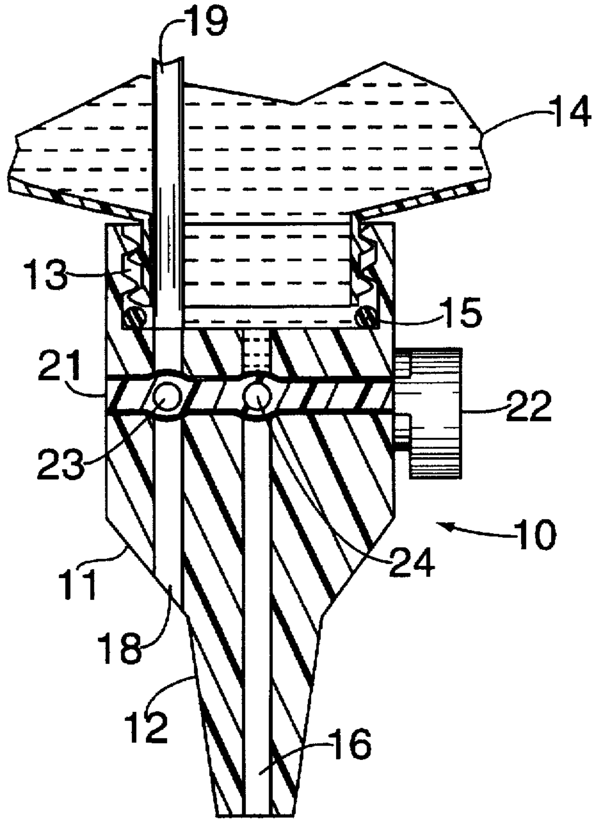
FIG. 2*a* is a cross-sectional view of a preferred embodiment of the valve and adapter shown threadably engaging a bottle or jug with a rubber "O" ring and showing the valve in a closed position.
Figure 2B:
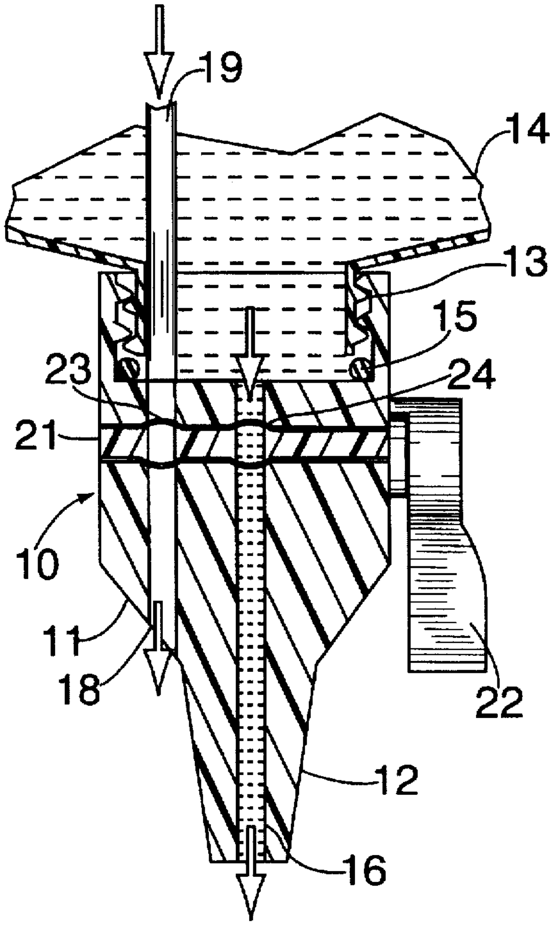
FIG. 2*b* is a cross-sectional view of FIG. 2*a* but showing the valve in an open position.
Figure 3:
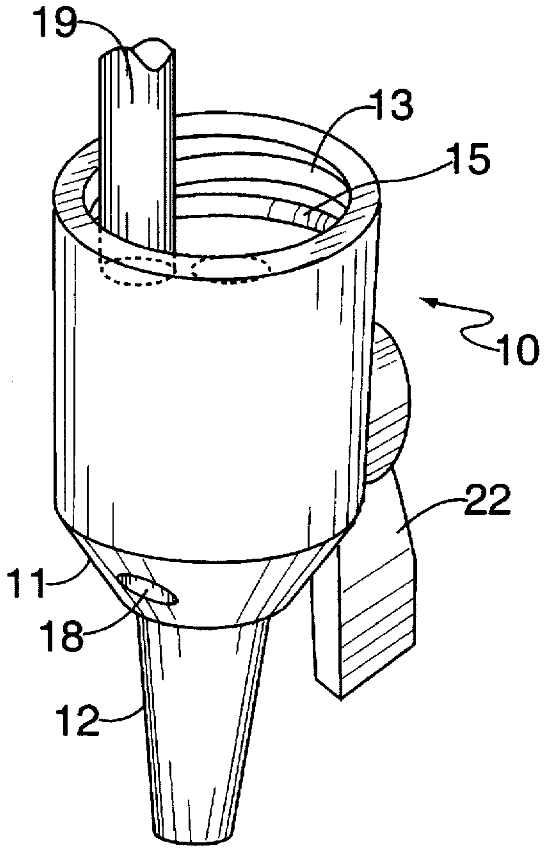
FIG. 3 is a perspective view of the preferred embodiment showing the internal threads and "O" ring.

Extending through adapter 10, above tapered portion 11, perpendicular to the longitudinal axis thereof, and therefore perpendicular to axially extending openings 16 and 18, and rotatable within adapter 10, is a valve 21 having a valve handle 22 operatively associated therewith at one end thereof for alternately opening and closing the valve 21 as best seen in FIGS. 2*b* and 2*a* respectively and as also illustrated in FIG. 1. Also as seen in FIGS. 2*a* and 2*b* the valve 21 has a length which is co-extensive with the outside diameter of adapter 10. First and second apertures 23 and 24 are formed through valve 21 and cooperate with axially extending openings 18 and 16 respectively for communicating with the ambient air and liquid in the container 14 when valve 21 is in the open position as shown in FIG. 2*b*. As clearly seen in FIGS. 2*a* and 2*b* at 23 and 24 valve 21 is not of constant diameter but its diameter is enlarged at apertures 23 and 24 where the valve cooperates with axially extending openings 16 and 18 for the purpose of preventing the valve from sliding out of adapter 10. With the valve in this open position apertures 23 and 24 are aligned with axially extending openings 18 and 16 respectively and therefore communicate, respectively, with the ambient air and liquid in the container 14 all as best seen in FIG. 2*b*. This position of the valve 21 allows the ambient air to communicate with axially extending opening 18, aperture 23, tube 19 and with the upper liquid level 20 thereby equalizing the air pressure inside and outside the container 14. Simultaneously, with the valve in this open position, the liquid in container 14 will flow downwardly through the container opening, aperture 24, axially extending opening 16, through discharge nozzle 12 and into liquid receiving means 17.

When the flow of liquid is to be discontinued valve handle 22 is rotated 90° thereby causing the apertures 23 and 24 to be out of alignment with axially extending openings 16 and 18 as seen in FIG. 2*a*.

Figure 4:
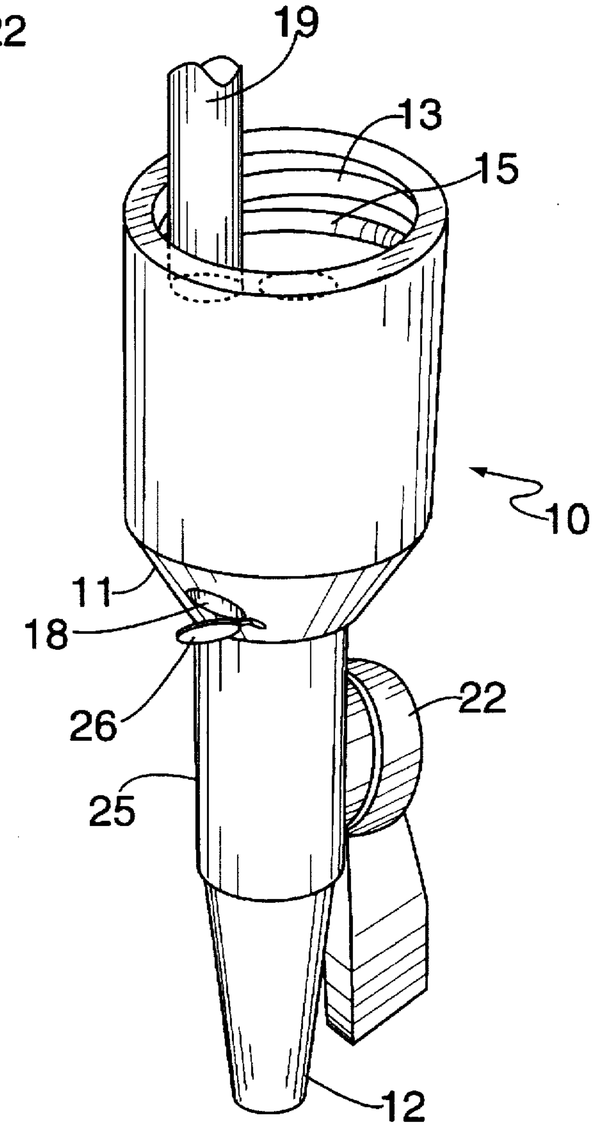
FIG. 4 is a perspective view of the first alternative embodiment showing the valve on a separate vertically extending section and an opening separately sealable.

In a first alternate embodiment as shown in FIG. 4 valve 21 and therefore valve handle 22 are rotatably disposed in a valve body 25 and not in the adapter 10 and therefore is below axially extending opening 18 for the ambient air. Therefore, there is no second aperture 23 in this embodiment and a seal, such as a cap 26, or any other suitable device is provided to prevent ambient air from communicating with the upper liquid level when the valve is in the closed position. Further, in this embodiment, discharge nozzle 12 is operatively associated with the lower end of valve body 25 by any well known means such as external or male threads of the discharge nozzle 12 engaging internal or female threads of valve body 25. In this embodiment, to discharge liquid from the container 14 and into liquid receiving means 17, the valve handle 22 is rotated to the open position and the seal 26 is opened to allow the equalization of air pressure inside and outside the liquid container thus allowing the liquid to flow.

Figure 5:
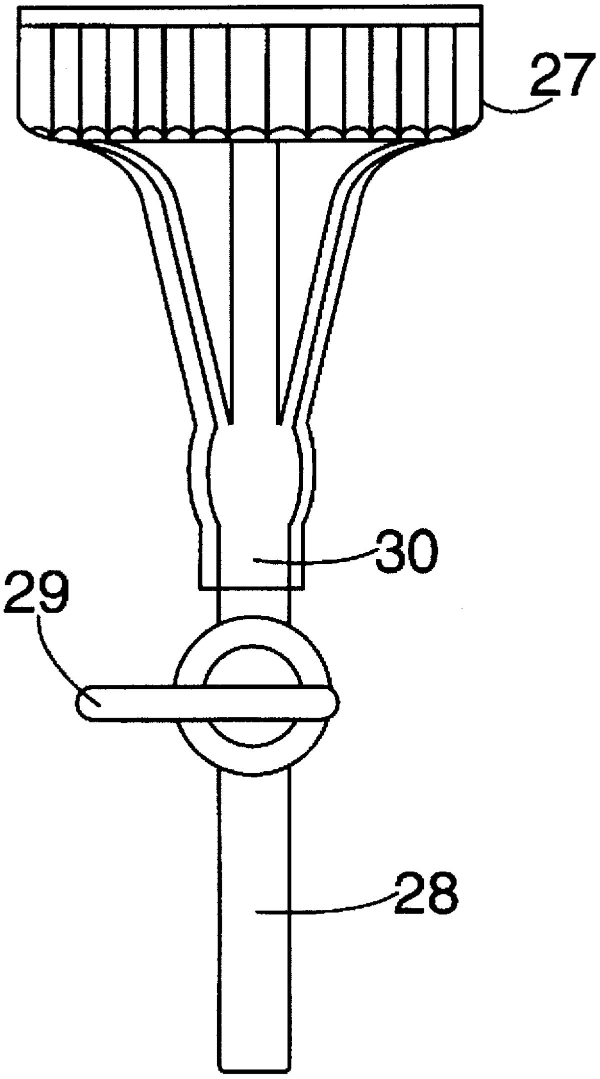
FIG. 5 is an elevational view of a second alternative embodiment wherein the bottle cap has an integral valve.

As a second alternative embodiment, as shown in FIG. 5, there is disclosed a bottle cap 27 for threadably engaging external threads of a liquid container having a valve 28 with valve handle 29 extending vertically therethrough and a discharge tube 30 extending axially between the bottle cap 27 at one end and the valve 28 at its other end. In this embodiment a pin or any other suitable puncture device is used to puncture a hole in the inverted container to allow for equalization of air pressure between the ambient air and the upper liquid level surface. The valve handle 29 is rotated 90° to alternately open and close the valve.

In all embodiments disclosed the inverted liquid container 14 can be held in place by any suitable means such as the wall mounted rack shown as 31 as clearly seen in FIG. 1. It should be obvious that any other means for holding a large bottle in an inverted position may be used in place of the wall mounted rack.

Though the invention has been described and illustrated with reference to a preferred embodiment thereof, those skilled in the art will appreciate that various changes and modifications in shape, size, composition, and arrangement of parts may be resorted to without departing from the spirit of the invention or scope of the subjoined claims.

What is claimed is:

1. A combined open-closed fluid flow control valve and adapter to be fitted to a liquid container having external threads for controlling the flow of liquid from the liquid container into a liquid receiving means when said liquid container is inverted comprising:

(a) an adapter;

(b) a tapered portion formed integrally with said adapter;

(c) a discharge nozzle extending downwardly from said tapered portion;

(d) female threads formed internally of said adapter for fitting said adapter to said liquid container;

(e) an axially extending opening formed through the length of said adapter and communicating at one end with said liquid in said container and at its other end with said discharge nozzle;

(f) a valve having a valve handle operatively associated with said adapter for controlling the flow of liquid from said liquid container wherein said valve is in fluid flow communication with said axially extending opening wherein said valve is a rod rotatable in said adapter and wherein said valve handle is attached to one end of said rod externally of said adapter, and wherein said valve is a rod having a length co-extensive with the outside diameter of said adapter and rotatable in said adapter and wherein said valve handle is attached to one end of said rod externally of said adapter said valve further having first and second apertures formed therethrough for communicating with ambient air and liquid in said container; and, (g) means for equalizing the pressure between the ambient air and the top of the liquid level in said inverted liquid container whereby when said valve handle is rotated to an open position liquid is caused to flow downwardly from said liquid container, through said valve, through said axially extending opening, through said discharge nozzle and into said liquid receiving means.

2. The combined open-closed fluid flow control valve and adapter of claim 1 wherein said means for equalizing the pressure between the ambient air and the top of the liquid level is an opening formed through the liquid container above said liquid level.

3. The combined open-closed fluid flow control valve and adapter of claim 2 wherein an "O" ring is disposed in the upper end of said adapter below said female threads for sealing said female threads from said liquid in said liquid container.

4. The combined open-closed fluid flow control valve and adapter of claim 3 wherein said valve extends through said adapter, above said tapered portion, perpendicular to the longitudinal axis thereof and perpendicular to said axially extending opening formed through the length of said adapter and is rotatably disposed in said adapter between an open and closed position.

5. The combined open-closed fluid flow control valve and adapter of claim 4 further comprising a second axially extending opening formed through a portion of said adapter wherein the lower end thereof terminates in said tapered portion and the upper end terminates at the upper end of said adapter and wherein a tube is inserted into said upper end of said second axially extending opening and wherein said tube extends upwardly above said liquid level whereby pressure is equalized between the ambient air and the top of said liquid surface.

6. The combined open-closed fluid flow control valve and adapter of claim 5 wherein said valve further comprises first and second apertures formed therethrough and cooperating with said first and said second axially extending openings when said valve is in an open position for communicating with said ambient air and said liquid in said container whereby said liquid is caused to flow from liquid container, through said first axially extending opening, and through said discharge nozzle.

7. A combined open-closed fluid flow control valve and adapter to be fitted to a liquid container having external threads for controlling the flow of liquid from the liquid container into a liquid receiving means when said liquid container is inverted comprising:

(a) an adapter;

(b) a tapered portion formed integrally with said adapter;

(c) a valve body extending downwardly from said tapered portion;

(d) a discharge nozzle extending downwardly from said valve body;

(e) female threads formed internally of said adapter for fitting said adapter to said liquid container;

(f) an axially extending opening formed through the length of said adapter and communicating at one end with said liquid in said container and at its other end with said discharge nozzle;

(g) a valve having a valve handle operatively associated with said valve body for controlling the flow of liquid from said liquid container wherein said valve is in fluid flow communication with said axially extending opening wherein said valve is a rod rotatable in said adapter and wherein said valve handle is attached to one end of said rod externally of said adapter and wherein said valve is a rod having a length co-extensive with the outside diameter of said adapter and rotatable in said adapter and wherein said valve handle is attached to one end of said rod externally of said adapter said valve further having first and second apertures formed therethrough for communicating with ambient air and liquid in said container; and, (h) means for equalizing the pressure between the ambient air and the top of the liquid level in said inverted liquid container whereby when said valve handle is rotated to an open position liquid is caused to flow downwardly from said liquid container, through said valve, through said axially extending opening through said discharge nozzle and into said liquid receiving means.

* * * * *